United States Patent
Gong et al.

(10) Patent No.: US 10,991,957 B2
(45) Date of Patent: Apr. 27, 2021

(54) FUEL CELL ASSEMBLY INCLUDING MULTIPLE FLOW CAPACITIES IN A CONDENSATION ZONE

(71) Applicant: DOOSAN FUEL CELL AMERICA, INC., South Windsor, CT (US)

(72) Inventors: Ke Gong, Ellington, CT (US); Nicholas Edward Osepowicz, Broad Brook, CT (US); Eric Livaich, South Windsor, CT (US); Anish Desouza, Sunderland, MA (US); Pat Brown, Bolton, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 202 days.

(21) Appl. No.: 15/827,750

(22) Filed: Nov. 30, 2017

(65) Prior Publication Data

US 2019/0165386 A1 May 30, 2019

(51) Int. Cl.
*H01M 8/0297* (2016.01)
*H01M 8/086* (2016.01)
(Continued)

(52) U.S. Cl.
CPC ......... *H01M 8/0297* (2013.01); *H01M 8/026* (2013.01); *H01M 8/0267* (2013.01);
(Continued)

(58) Field of Classification Search
CPC .. H01M 8/0297; H01M 8/2459; H01M 8/026; H01M 8/0267; H01M 8/04119; H01M 8/04731; H01M 8/086
See application file for complete search history.

(56) References Cited

U.S. PATENT DOCUMENTS 4,345,008 A   8/1982   Breault
4,463,067 A   7/1984   Feigenbaum
(Continued)

FOREIGN PATENT DOCUMENTS

JP   H05190186 A   7/1993
JP   H06251790 A   9/1994
(Continued)

OTHER PUBLICATIONS

International Search Report and Written Opinion of the International Searching Authority for International application No. PCT/US2018/055390 dated Jan. 29, 2019.
(Continued)

*Primary Examiner* — Helen Oi K Conley
(74) *Attorney, Agent, or Firm* — Carlson, Gaskey & Olds (57) ABSTRACT

An illustrative example fuel cell assembly includes a plurality of cells respectively including at least an electrolyte layer, an anode flow plate on one side of the electrolyte layer, and a cathode flow plate on an opposite side of the electrolyte layer. At least one cooler is situated adjacent a first one of the cells. The cooler is closer to that first one of the cells than it is to a second one of the cells. The cathode flow plates respectively include a plurality of flow channels and the anode flow plates respectively include a plurality of flow channels. The anode flow plates respectively include some of the flow channels in a condensation zone of the fuel cell assembly. The flow channels of the anode flow plate in the condensation zone of the first one of the cells have a first flow capacity. The flow channels of the anode flow plate of the second one of the cells that are in the condensation zone have a second flow capacity. The second flow capacity is greater than the first flow capacity.

18 Claims, 4 Drawing Sheets

(51) Int. Cl.
  *H01M 8/0267* (2016.01)
  *H01M 8/026* (2016.01)
  *H01M 8/04119* (2016.01)
  *H01M 8/24* (2016.01)
  *H01M 8/04701* (2016.01)

(52) U.S. Cl.
  CPC ... *H01M 8/04119* (2013.01); *H01M 8/04731* (2013.01); *H01M 8/086* (2013.01); *H01M 8/2459* (2016.02)

(56) References Cited

U.S. PATENT DOCUMENTS

| | | | | |
|---|---|---|---|---|
| 5,230,966 | A * | 7/1993 | Voss | H01M 8/04074 |
| | | | | 429/434 |
| 5,344,722 | A | 9/1994 | Bjerrum et al. | |
| 7,718,295 | B2 * | 5/2010 | Haltiner, Jr. | H01M 8/0228 |
| | | | | 216/17 |
| 2001/0021470 | A1 * | 9/2001 | May | H01M 4/8652 |
| | | | | 429/414 |
| 2005/0003257 | A1 * | 1/2005 | Willimowski | H01M 8/04089 |
| | | | | 429/443 |
| 2005/0238943 | A1 | 10/2005 | Akiyama et al. | |
| 2007/0172709 | A1 * | 7/2007 | Nakakubo | H01M 8/1097 |
| | | | | 429/446 |
| 2009/0025566 | A1 * | 1/2009 | Son | H01M 8/04164 |
| | | | | 96/397 |
| 2012/0028156 | A1 | 2/2012 | Song et al. | |
| 2014/0065508 | A1 * | 3/2014 | Darga | H01M 8/0258 |
| | | | | 429/457 |

FOREIGN PATENT DOCUMENTS

| | | | | |
|---|---|---|---|---|
| JP | H09223505 A | | 8/1997 | |
| JP | H10340733 A | | 12/1998 | |
| JP | H1116589 A | | 1/1999 | |
| JP | 2003157887 A | | 5/2003 | |
| WO | PCT/CA2007/001443 | * | 2/2008 | H01M 8/04 |
| WO | 2008/079126 A1 | | 7/2008 | |
| WO | 2013126075 A1 | | 8/2013 | |

OTHER PUBLICATIONS

International Search Report and Written Opinion of the International Searching Authority for International application No. PCT/US2018/055386 dated Jan. 29, 2019.

* cited by examiner

FUEL CELL ASSEMBLY INCLUDING MULTIPLE FLOW CAPACITIES IN A CONDENSATION ZONE

BACKGROUND

Fuel cells produce electricity based on an electrochemical reaction. Efficient power production and useful fuel cell life depend, at least in part, on proper temperature management within a fuel cell assembly. One feature many fuel cell assemblies include for temperature management includes coolers that introduce a cooling fluid within the assembly.

One aspect of known cooler arrangements is that they tend to provide uneven cooling throughout a cell stack assembly. Cells that are closer to the cooler experience more cooling effect than cells that are spaced further away from a cooler. Differing temperatures among different cells within a cell stack assembly tend to have different effects on the performance or life of the various cells.

For example, in liquid electrolyte fuel cells, such as those that use phosphoric acid as an electrolyte, higher temperature cells tend to experience a higher acid loss rate compared to cells that tend to operate cooler. For example, the anode gas in portions of a colder cell contains less acid or liquid electrolyte than that in a hot cell. Often, the fuel is fed to the fuel cell using multiple passes with external manifolds to redistribute the flow from one pass to the next. When the gas from the hot cell and cold cell are mixed at an external manifold and redistributed to the anode flow plates liquid electrolyte tends to transfer from the hot cells to the cold cells. The acid loss rate of the hot cells tends to limit the life of such a cell. Further, there is a possibility for flooding the colder cells with liquid electrolyte.

Given the limited amount of space within a fuel cell assembly, it is not typically possible to increase the number of coolers throughout the assembly to provide more uniform cooling effect. It would be beneficial to have a lower acid loss rate to increase overall fuel cell efficiency and extend the useful life of a cell stack assembly.

SUMMARY

An illustrative example fuel cell assembly includes a plurality of cells respectively including at least an electrolyte layer, an anode flow plate on one side of the electrolyte layer, and a cathode flow plate on an opposite side of the electrolyte layer. At least one cooler is situated adjacent a first one of the cells. The cooler is closer to that first one of the cells than it is to a second one of the cells. The cathode flow plates respectively include a plurality of flow channels and the anode flow plates respectively include a plurality of flow channels. The anode flow plates respectively include some of the flow channels in a condensation zone of the fuel cell assembly. The flow channels of the anode flow plate in the condensation zone of the first one of the cells have a first flow capacity. The flow channels of the anode flow plate of the second one of the cells that are in the condensation zone have a second flow capacity. The second flow capacity is greater than the first flow capacity.

In an example embodiment having one or more features of the fuel cell assembly of the previous paragraph, the first flow capacity is defined by a total flow capacity of the some of the flow channels of the anode flow plate of the first one of the cells and the second flow capacity is defined by a total flow capacity of the some of the flow channels of the anode flow plate of the second one of the cells.

In an example embodiment having one or more features of the fuel cell assembly of any of the previous paragraphs, the some of the flow channels of the anode flow plate of the first one of the cells comprise a first number of flow channels, the some of the flow channels of the anode flow plate of the second one of the cells comprise a second number of flow channels, and the second number is greater than the first number.

In an example embodiment having one or more features of the fuel cell assembly of any of the previous paragraphs, the some of the flow channels of the anode flow plate of the first one of the cells have a first cross-sectional area, the some of the flow channels of the anode flow plate of the second one of the cells have a second cross-sectional area, and the second cross-sectional area is greater than the first cross-sectional area.

In an example embodiment having one or more features of the fuel cell assembly of any of the previous paragraphs, the first cross-sectional area is defined by a first depth and a first width, the second cross-sectional area is defined by a second depth and a second width, and at least one of the second depth and the second width is greater than at least one of the first depth and the first width, respectively.

In an example embodiment having one or more features of the fuel cell assembly of any of the previous paragraphs, the some of the flow channels of the anode flow plate of the first one of the cells comprise a first surface roughness that establishes a first flow resistance, the some of the flow channels of the anode flow plate of the second one of the cells comprise a second surface roughness that establishes a second flow resistance, and the first flow resistance is greater than the second flow resistance.

In an example embodiment having one or more features of the fuel cell assembly of any of the previous paragraphs, the some of the flow channels of the anode flow plate of the first one of the cells have a first cross-sectional area, the some of the flow channels of the anode flow plate of the second one of the cells have a second cross-sectional area, and the second cross-sectional area is greater than the first cross-sectional area.

In an example embodiment having one or more features of the fuel cell assembly of any of the previous paragraphs, the some of the flow channels of the anode flow plate of the first one of the cells have a first depth, the some of the flow channels of the anode flow plate of the second one of the cells have a second depth, and the second depth is greater than the first depth.

In an example embodiment having one or more features of the fuel cell assembly of any of the previous paragraphs, the some of the flow channels of the anode flow plate of the first one of the cells have a first width, the some of the flow channels of the anode flow plate of the second one of the cells have a second width, and the second width is greater than the first width.

In an example embodiment having one or more features of the fuel cell assembly of any of the previous paragraphs, the some of the flow channels of the anode flow plate of the first one of the cells have a first width, the some of the flow channels of the anode flow plate of the second one of the cells have a second width, and the second width is greater than the first width.

In an example embodiment having one or more features of the fuel cell assembly of any of the previous paragraphs, others of the flow channels of the anode flow plates are in an active region of the fuel cell assembly and a flow capacity of the others of the flow channels of the first one of the anode flow plates is the same as a flow capacity of the others of the flow channels of the second one of the anode flow plates.

In an example embodiment having one or more features of the fuel cell assembly of any of the previous paragraphs, the plurality of cells are situated between the at least one cooler and the second cooler, and there is at least one first one of the cells adjacent each of the coolers.

In an example embodiment having one or more features of the fuel cell assembly of any of the previous paragraphs, the second one of the fuel cells is closer to the at least one cooler than a third one of the fuel cells, the some of the flow channels of the anode flow plate of the third one of the fuel cells have a third flow capacity, and the third flow capacity is greater than the second flow capacity.

In an example embodiment having one or more features of the fuel cell assembly of any of the previous paragraphs, the flow capacity of the some of the flow channels of the anode flow plates progressively varies dependent on a distance between the cooler and the respective anode flow plate and the anode flow plates that are further from the at least one cooler have a larger flow capacity through the some of the flow channels.

In an example embodiment having one or more features of the fuel cell assembly of any of the previous paragraphs, the electrolyte layer comprises a matrix that contains a liquid electrolyte.

In an example embodiment having one or more features of the fuel cell assembly of any of the previous paragraphs, the liquid electrolyte comprises phosphoric acid.

An illustrative example method of operating a fuel cell assembly having a plurality of anode flow plates that respectively include a plurality of flow channels includes: permitting a first flow rate through at least some of the flow channels of a first one of the anode flow plates; and permitting a second flow rate through at least some of the flow channels of a second one of the anode flow plates. The second flow rate is greater than the first flow rate and the at least some of the flow channels are in a condensation zone of the fuel cell assembly.

In an example embodiment having one or more features of the method of the previous paragraph, the first one of the anode flow plates has a first operating temperature, the second one of the anode flow plates has a second operating temperature, and the second operating temperature is greater than the first operating temperature.

An example embodiment having one or more features of the method of any of the previous paragraphs includes achieving a first amount of electrolyte condensation with the first one of the anode flow plates and achieving a second amount of electrolyte condensation with the second one of the anode flow plates, wherein the second amount of electrolyte condensation is greater than the first amount of electrolyte condensation.

In an example embodiment having one or more features of the method of any of the previous paragraphs, the some of the flow channels of the first one of the anode flow plates have a first flow capacity, the some of the flow channels of the second one of the anode flow plates have a second flow capacity, and the second flow capacity is greater than the first flow capacity.

Various features and advantages of at least one disclosed embodiment will become apparent to those skilled in the art from the following detailed description. The drawings that accompany the detailed description can be briefly described as follows.

DETAILED DESCRIPTION

Figure 1:
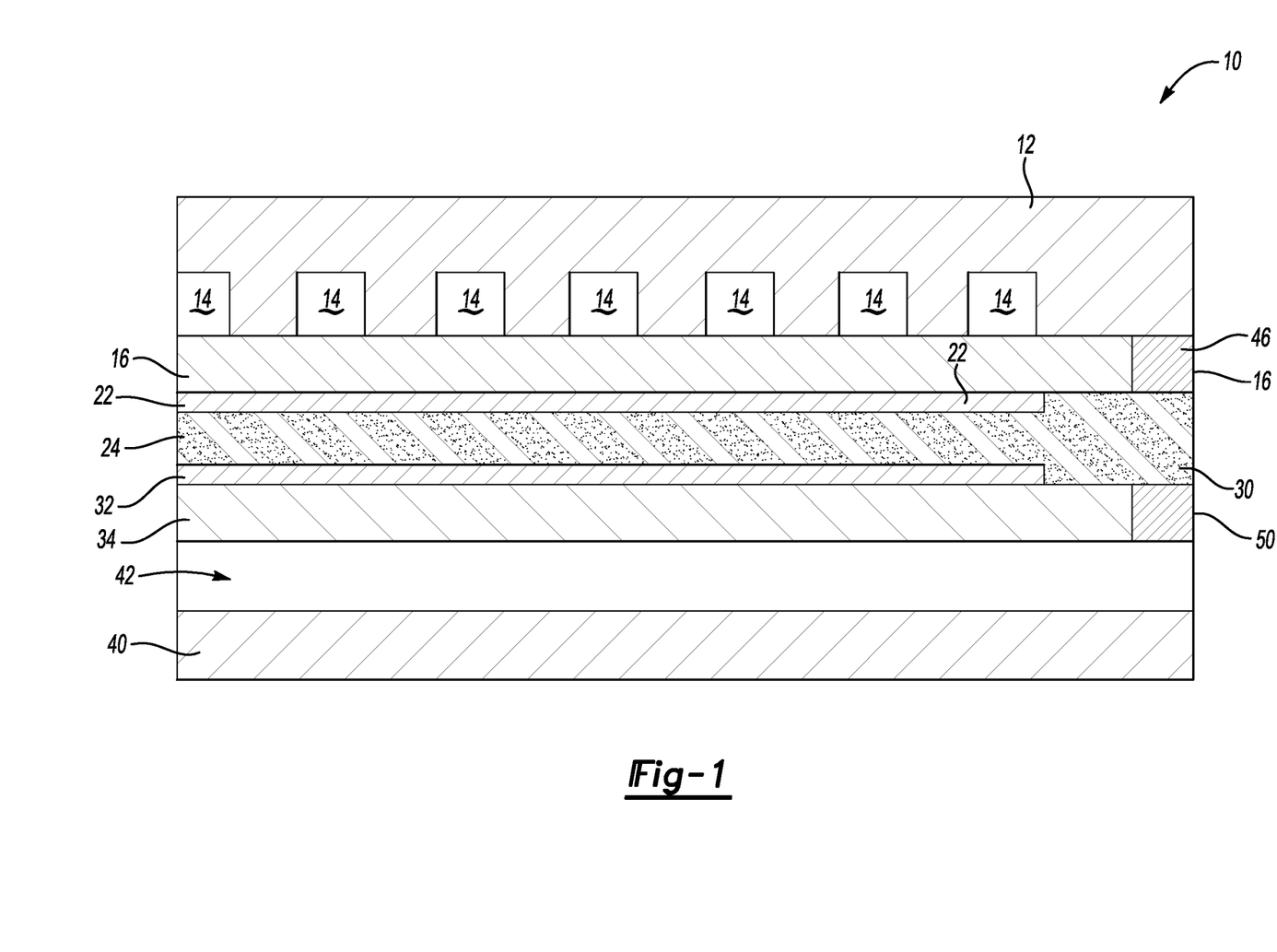
FIG. 1 schematically illustrates selected portions of an example fuel cell configuration designed according to an embodiment of this invention.

A liquid electrolyte fuel cell 10 is schematically represented in FIG. 1. Components of an individual cell are illustrated in FIG. 1. Those skilled in the art understand how a stack of such cells are assembled into a fuel cell stack assembly.

The fuel cell 10 includes a cathode flow plate 12 that is configured for directing an oxidant reactant stream flow through the fuel cell 10 through a plurality of oxidant flow channels 14 that are established or defined within the cathode flow plate 12. A cathode substrate layer is situated adjacent the cathode flow plate 12. A cathode catalyst layer 22 is situated adjacent the cathode substrate layer 16.

An electrolyte layer 24 is situated adjacent the cathode catalyst layer 22. The electrolyte layer 24 in this example is a liquid electrolyte retaining matrix. Liquid electrolyte is schematically represented at 30 in FIG. 1. In some embodiments, the liquid electrolyte comprises phosphoric acid.

An anode catalyst layer 32 is situated adjacent the electrolyte layer 24 on an opposite side from the cathode catalyst layer 22. An anode substrate layer 34 is situated adjacent the anode catalyst layer 32. An anode flow plate 40 includes a plurality of fuel flow channels 42. The anode flow plate 40 is situated adjacent the anode substrate layer 34. The fuel flow channels 42 are configured for directing a flow of fluid reactant into pores of the anode substrate layer 34 so that fuel reaches the anode catalyst layer 32.

To prevent gaseous reactant streams from undesirably escaping the substrate layers, the cathode substrate layer 16 includes an edge seal 46 and the anode substrate layer 34 includes an edge seal 50. The edge seals 46 and 50 also prevent undesirable movement of a liquid electrolyte or liquid byproducts out of the perimeter of the fuel cell 10. Such edge seals are generally known.

Figure 2:
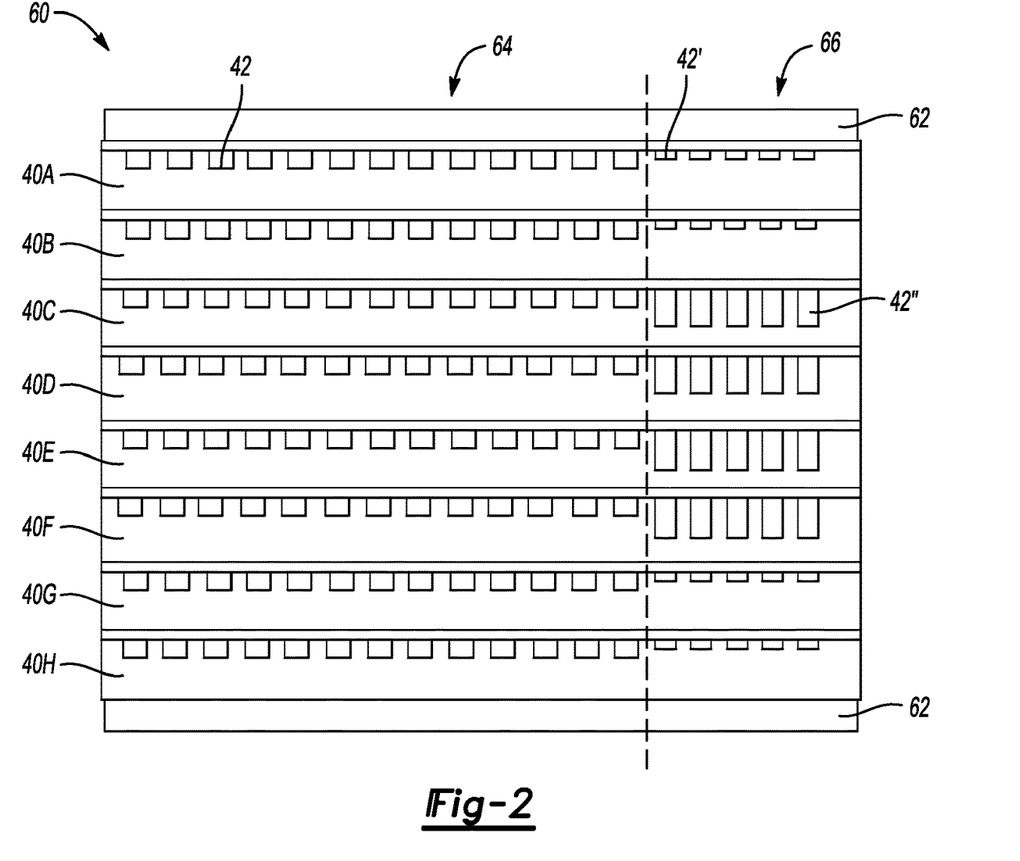
FIG. 2 schematically illustrates selected portions of an example fuel cell stack assembly designed according to an embodiment of this invention.

FIG. 2 schematically illustrates selected portions of a fuel cell stack assembly 60. Coolers 62 are configured for directing a cooling fluid within the assembly 60 in a known manner for managing the temperature of the individual cells of the assembly. For simplicity of illustration, only the anode flow plates 40 of the individual cells are shown in FIG. 2. Those skilled in the art will realize that each individual cell includes the various components shown in FIG. 1.

The fuel cell assembly 60 includes an active portion or region 64 and a condensation zone 66. The active region or portion 64 is where the electrochemical reaction takes place for generating electricity. The condensation zone 66 may be considered an inactive portion or section of each individual cell.

In the illustrated arrangement, there are eight anode flow plates 40 between two coolers 62. The flow plates 40A, 40B, 40G and 40H are closer to the coolers 62 than the flow plates 40C, 40D, 40E and 40F. Given their respective proximity to the coolers 62, the different flow plates will experience different temperatures during fuel cell assembly operation.

The anode flow plates 40 in the illustrated embodiment include different flow capacities within the condensation zone 66 depending on the proximity of the flow plate to a cooler.

A first one of the anode flow plates 40A has a first flow capacity through the fuel flow channels 42' in the condensation zone 66. A second one of the anode flow plates 40C has a second flow capacity through the fuel flow channels 42" in the condensation zone 66. Having different flow capacities through the fuel flow channels 42' and 42" reduces or minimizes the acid loss rate in the cells that tend to be hotter. Additionally, the different flow capacities in the respective flow channels 42' and 42" within the condensation zone 66 also reduces or minimizes a liquid electrolyte flooding the anode flow plates 40 of the cells having a lower temperature than others of the cells.

The illustrated example embodiment includes a first cross-sectional area of the flow channels 42' in the first one of the anode flow plates 40A. The flow channels 42" in the second one of the flow plates 40C have a second cross-sectional area. As can be appreciated from FIG. 2, the first cross-sectional area of the flow channels 42' is smaller than the second cross-sectional area of the flow channels 42". Having a smaller cross-sectional area restricts the amount of fuel flow through the flow channels 42' compared to the flow channels 42".

In the example of FIG. 2, the different cross-sectional areas are realized by having a first depth of the flow channels 42' compared to a second, larger depth of the flow channels 42". The width of the respective flow channels 42' and 42" is approximately the same in the example of FIG. 2.

Figure 3:
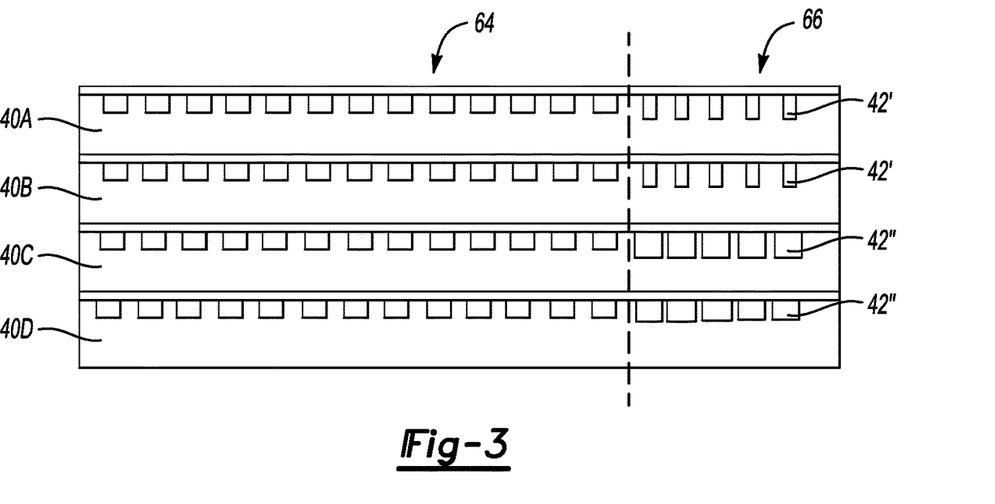
FIG. 3 schematically illustrates another example configuration of a portion of a fuel cell assembly designed according to an embodiment of this invention.

FIG. 3 schematically illustrates another configuration in which the flow channels 42' of the first one of the anode flow plates 40A have a smaller width, which is a horizontal dimension in the drawing, compared to the width of the flow channels 42" of the second one of the anode flow plates 40C in the condensation zone 66. The depth of the respective channels 42' and 42" in this example is approximately the same.

Figure 4:
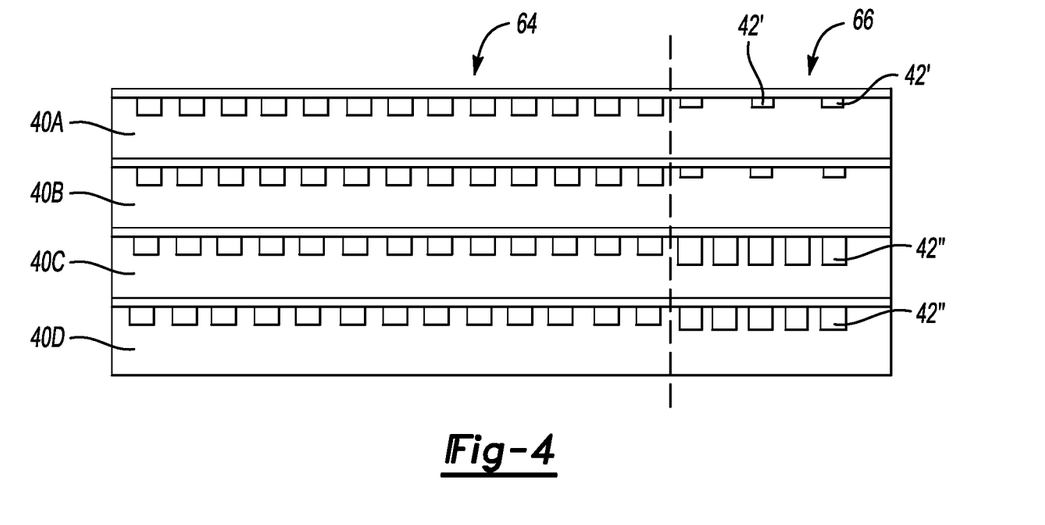
FIG. 4 schematically illustrates another configuration of a selected portion of a fuel cell assembly designed according to an embodiment of this invention.

FIG. 4 schematically illustrates another configuration in which there are fewer flow channels 42' compared to the flow channels 42". Having fewer channels allows less fuel flow through the channels 42' in the condensation zone 66 compared to the amount of fuel that is able to flow through the channels 42" in the condensation zone 66. Realizing a smaller number of channels for one of the anode flow plates compared to another may be accomplished by establishing fewer channels in the portion of the flow plate 40 that will be situated in the condensation zone 66. In another example embodiment, a complete or partial blockage is situated for effectively preventing flow through a selected number of the channels on a portion of the flow plate 40 that will be situated in the condensation zone 66.

The example of FIG. 4 also includes a different cross-sectional area for the flow channels 42' compared to the flow channels 42".

Figure 5:
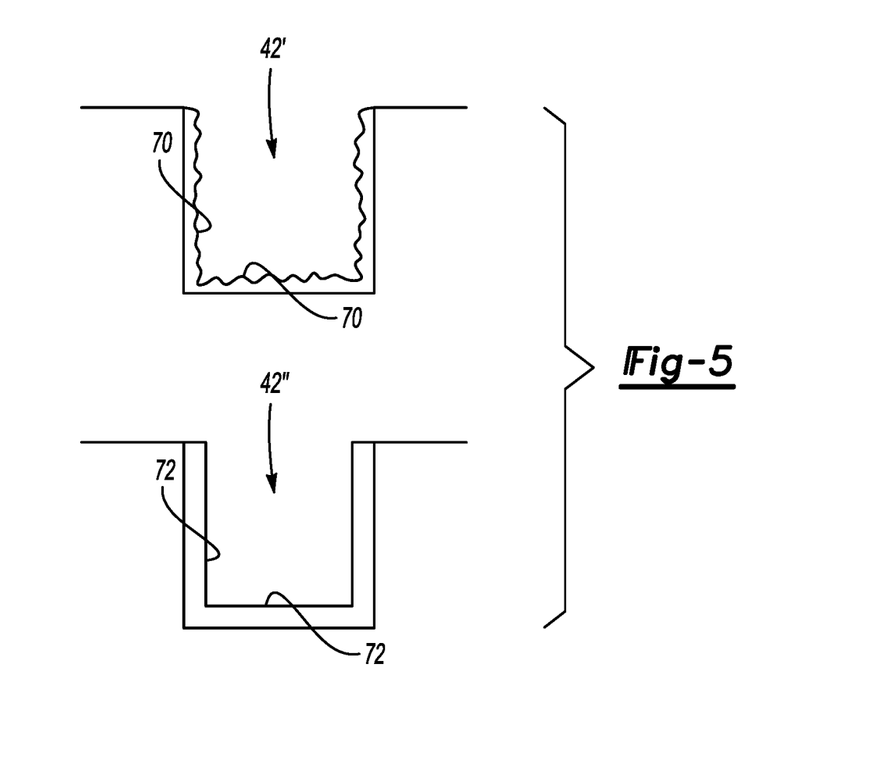
FIG. 5 schematically illustrates selected features of another example embodiment.

FIG. 5 schematically illustrates a feature of another example embodiment. In this example, the flow channels 42' have a rougher or more varied surface texture schematically shown at 70 compared to a smoother or more uniform surface texture 72 within the flow channels 42". A more course or rougher texture within a flow channel tends to introduce more turbulence which tends to reduce fuel flow through such a channel.

Figure 6:
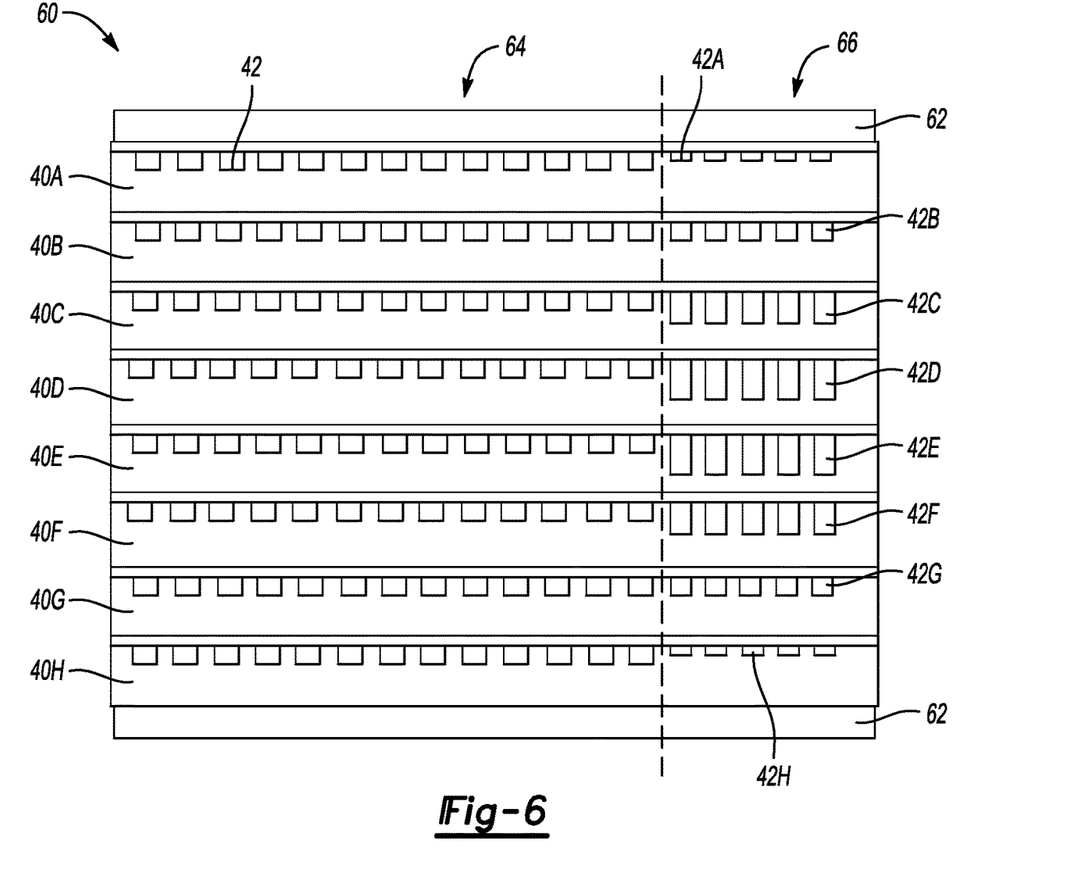
FIG. 6 schematically illustrates selected features of another example embodiment.

FIG. 6 illustrates another embodiment in which the flow capacity of the flow channels 42 in the condensation zone 66 progressively vary depending on the distance between a cooler and the respective anode flow plate 40. In this example, the flow plates 40A and 40H are the closest to the coolers 62 and their flow channels 42A and 42H have the smallest flow capacity in the condensation zone 66. The flow plates 40B and 40G are the next closest and their respective flow channels 42B and 42G have a greater flow capacity than the flow channels 42A and 42H. Similarly, the flow channels 42C and 42F have a greater flow capacity than the flow channels 42B and 42G but a smaller flow capacity than the flow channels 42D and 42E.

In FIG. 6 different flow channel depths provide or establish the different flow capacities. Other embodiments have progressively varying flow capacities that are established or defined by other features, such as those shown in the other drawings and described above.

Various flow channel configurations are shown in the different illustrations. Those configurations are not exclusive to those particular example embodiments. Combinations of selected ones of those features may be used for other ways of realizing different flow capacities through the flow channels situated in a condensation zone for different flow plates.

The different flow capacities in the different anode flow plates depending on their proximity to a cooler 62 reverses the process that would otherwise occur because of the different temperatures of the cells. Without the different flow capacities, liquid electrolyte carried by fuel flowing through the active region 64, which may be referred to as the second pass of the respective flow plates, is lower in the cooler cells compared to that within the corresponding flow channels of the warmer cells further from the coolers 62. In the case of FIG. 2, the anode flow plates 40A, 40B, 40G and 40H are considered cooler or lower temperature than the anode flow plates 40C, 40D, 40E and 40F. The number of cells or flow plates that are considered warmer or cooler may vary and those skilled in the art will realize which cells fit into which category depending on their particular fuel cell assembly configuration and cooler placement.

Having the different flow capacities reduces or prevents the net transfer of acid from the hot cells to the cold cells. The flow rate through the cooler cells having the flow channels 42' is lower compared to the flow rate through the channels 42". More liquid electrolyte may be condensed in the condensation zone 66 in the warmer flow plates (e.g., 40C, 40D, 40E, 40F in FIG. 2) including the flow channels 42" having a larger flow capacity. The lower flow capacity in the condensation zones 66 of the cooler cells including flow channels 42' allows for less acid to be condensed in the third pass of those cells within the condensation zone 66.

The different flow capacities reduces the acid or liquid electrolyte loss rate from the higher temperature cells and the potential for acid or liquid electrolyte flooding in the colder cells can also be reduced.

Providing different flow capacities and permitting different flow rates through the flow channels of different ones of the anode flow plates 40 within the condensation zone 66 improves fuel cell performance and extends the useful life of a fuel cell assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell assembly, comprising:
a first cooler;
a second cooler;
a plurality of cells arranged in a stack between the first cooler and the second cooler, the plurality of cells respectively including at least an electrolyte layer containing a liquid electrolyte, an anode flow plate on one side of the electrolyte layer, and a cathode flow plate on an opposite side of the electrolyte layer; and
wherein
the cathode flow plates respectively include a plurality of flow channels,
the anode flow plates respectively include a plurality of flow channels,
the anode flow plates respectively include condensation zone flow channels in a condensation zone of the fuel cell assembly,
at least some of the liquid electrolyte condenses in the condensation zone,
first cells of the plurality of cells are situated near opposite ends of the stack,
at least one second cell of the plurality of cells is situated near a middle of the stack,
each of the first cells is closer to one of the coolers than the second cell,
the condensation zone flow channels of the anode flow plate of each of the first cells have a first flow capacity,
the condensation zone flow channels of the anode flow plate of the second cell have a second flow capacity,
the second flow capacity is greater than the first flow capacity, and
a difference between the first flow capacity and the second flow capacity inhibits transfer of condensed liquid electrolyte from the second cell to the first cells.

2. The fuel cell assembly of claim 1, wherein
the first flow capacity is defined by a total flow capacity of the condensation zone flow channels of the anode flow plate of each of the first cells; and
the second flow capacity is defined by a total flow capacity of the condensation zone flow channels of the anode flow plate of the second cell.

3. The fuel cell assembly of claim 2, wherein
the condensation zone flow channels of the anode flow plate of each of the first cells comprise a first number of flow channels;
the condensation zone flow channels of the anode flow plate of the second cell comprise a second number of flow channels; and
the second number is greater than the first number.

4. The fuel cell assembly of claim 2, wherein
the condensation zone flow channels of the anode flow plate of each of the first cells have a first cross-sectional area;
the condensation zone flow channels of the anode flow plate of the second cell have a second cross-sectional area; and
the second cross-sectional area is greater than the first cross-sectional area.

5. The fuel cell assembly of claim 4, wherein
the first cross-sectional area is defined by a first depth and a first width;
the second cross-sectional area is defined by a second depth and a second width; and
at least one of the second depth and the second width is greater than at least one of the first depth and the first width, respectively.

6. The fuel cell assembly of claim 1, wherein
the condensation zone flow channels of the anode flow plate of each of the first cells comprise a first surface roughness that establishes a first flow resistance;
the condensation zone flow channels of the anode flow plate of the second cell comprise a second surface roughness that establishes a second flow resistance; and
the first flow resistance is greater than the second flow resistance.

7. The fuel cell assembly of claim 1, wherein
the condensation zone flow channels of the anode flow plate of each of the first cells have a first cross-sectional area;
the condensation zone flow channels of the anode flow plate of the second cell have a second cross-sectional area; and
the second cross-sectional area is greater than the first cross-sectional area.

8. The fuel cell assembly of claim 1, wherein
the condensation zone flow channels of the anode flow plate of each of the first cells have a first depth;
the condensation zone flow channels of the anode flow plate of the second cell have a second depth; and
the second depth is greater than the first depth.

9. The fuel cell assembly of claim 8, wherein
the condensation zone flow channels of the anode flow plate of each of the first cells have a first width;
the condensation zone flow channels of the anode flow plate of the second cell have a second width; and
the second width is greater than the first width.

10. The fuel cell assembly of claim 1, wherein
the condensation zone flow channels of the anode flow plate of each of the first cells have a first width;
the condensation zone flow channels of the anode flow plate of the second cell have a second width; and
the second width is greater than the first width.

11. The fuel cell assembly of claim 1, wherein
others of the flow channels of the anode flow plates are in an active region of the fuel cell assembly; and
a flow capacity of the others of the flow channels of the anode flow plates of each of the first cells is the same as a flow capacity of the others of the flow channels of the anode flow plates of the second cell.

12. The fuel cell assembly of claim 1, wherein
the second cell is closer to at least one of the coolers than a third one of the fuel cells;
the condensation zone flow channels in the condensation zone of the anode flow plate of the third one of the fuel cells have a third flow capacity; and
the third flow capacity is greater than the second flow capacity.

13. The fuel cell assembly of claim 1, wherein
the flow capacity of the condensation zone flow channels of the anode flow plates progressively varies dependent on a distance between at least one of the coolers and the respective anode flow plate; and
the anode flow plates that are further from the at least one of the coolers have a larger flow capacity through the condensation zone flow channels.

14. The fuel cell assembly of claim 1, wherein the electrolyte layer comprises a matrix that contains the liquid electrolyte.

15. The fuel cell assembly of claim 14, wherein the liquid electrolyte comprises phosphoric acid.

16. The fuel cell assembly of claim 1, wherein the first flow capacity is the same in each of the first cells.

17. The fuel cell assembly of claim 1, wherein the first flow capacity is different in the one of the first cells compared to another of the first cells.

18. The fuel cell assembly of claim 1, wherein the at least one second cell comprises a plurality of second cells each having the second flow capacity.

* * * * *